(12) United States Patent
Makino et al.

(10) Patent No.: US 11,458,834 B2
(45) Date of Patent: Oct. 4, 2022

(54) FLUID CONTROL VALVE AND EVAPORATED FUEL PROCESSING DEVICE

(71) Applicant: AISAN KOGYO KABUSHIKI KAISHA, Obu (JP)

(72) Inventors: Katsuhiko Makino, Aichi-ken (JP); Yasuhiro Tsuzuki, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 17/059,456

(22) PCT Filed: May 27, 2019

(86) PCT No.: PCT/JP2019/020908
§ 371 (c)(1),
(2) Date: Nov. 29, 2020

(87) PCT Pub. No.: WO2019/235284
PCT Pub. Date: Dec. 12, 2019

(65) Prior Publication Data
US 2021/0206257 A1 Jul. 8, 2021

(30) Foreign Application Priority Data
Jun. 6, 2018 (JP) .............................. JP2018-108260

(51) Int. Cl.
*B60K 15/035* (2006.01)
*B01D 53/02* (2006.01)
(Continued)

(52) U.S. Cl.
CPC ........ *B60K 15/03519* (2013.01); *B01D 53/02* (2013.01); *F16K 17/196* (2013.01);
(Continued)

(58) Field of Classification Search
CPC ....... F02M 25/0836; F02M 2025/0845; B60K 15/03519
(Continued)

(56) References Cited

U.S. PATENT DOCUMENTS 5,211,151 A * 5/1993 Nakajima ........ B60K 15/03519
123/516
8,584,704 B2 * 11/2013 Pifer .................. F02M 25/0836
137/599.11
(Continued)

FOREIGN PATENT DOCUMENTS

CN 103162477 A 6/2013
EP 2518332 A1 10/2012
(Continued)

OTHER PUBLICATIONS

PCT/JP2019/020908 International Search Report and Written Opinion dated Aug. 27, 2019 (9 p.).
(Continued)

*Primary Examiner* — Robert K Arundale
(74) *Attorney, Agent, or Firm* — Conley Rose, P.C.

(57) ABSTRACT

A fluid control valve is made compact by changing the shape of a communication passage within the fluid control valve. The fluid control valve includes a valve casing, an electric valve disposed in the valve casing, and a relief valve disposed in the valve casing. The valve casing includes: a main passage that has a first valve port sealed by the electric valve; a bypass passage for bypassing the first valve port; a first valve chamber in fluid communication with the downstream side of the first valve port and housing the electric valve; and a second valve chamber in fluid communication with the upstream side of the first valve port and housing the relief valve. The bypass passage includes a communication passage configured to allow the first valve chamber and the second valve chamber to fluidly communicate with each
(Continued)

other. The communication passage opens to a first side surface of the first valve chamber and/or into a side surface of the second valve chamber.

7 Claims, 11 Drawing Sheets

(51) Int. Cl.
    *F16K 17/196*     (2006.01)
    *F16K 31/04*     (2006.01)
    *F16K 31/50*     (2006.01)
    *B60K 15/03*     (2006.01)
    *F02M 25/08*     (2006.01)

(52) U.S. Cl.
    CPC ............ *F16K 31/04* (2013.01); *F16K 31/508* (2013.01); *B01D 2253/102* (2013.01); *B01D 2259/4516* (2013.01); *B60K 2015/03256* (2013.01); *F02M 25/0836* (2013.01)

(58) Field of Classification Search
    USPC ........................................................ 123/516
    See application file for complete search history.

(56) References Cited

U.S. PATENT DOCUMENTS

| | | | |
|---|---|---|---|
| 8,844,561 B2* | 9/2014 | Keller | ................ G01L 19/0092 137/487.5 |
| 8,985,548 B2 | 3/2015 | Arai | |
| 9,086,161 B2 | 7/2015 | Onodera et al. | |
| 9,902,258 B2* | 2/2018 | Young | .............. B60K 15/03519 |
| 2016/0186697 A1* | 6/2016 | Tsuzuki | .................... F16K 1/36 123/519 |
| 2017/0356394 A1* | 12/2017 | Murai | ................. F02D 41/0045 |

FOREIGN PATENT DOCUMENTS

| | | |
|---|---|---|
| JP | 2005-036849 A | 2/2005 |
| JP | 2012233512 A | 11/2012 |
| JP | 2013015208 A | 1/2013 |
| JP | 2016121650 A | 7/2016 |
| JP | 6275633 B2 | 2/2018 |

OTHER PUBLICATIONS

PCT/JP2019/020908 Article 34 Amendment dated Aug. 6, 2020 (5 p.).
PCT/JP2019/020908 International Preliminary Report on Patentability dated Aug. 27, 2020 (9 p.).
English Translation of PCT/JP2019/020908 International Preliminary Report on Patentability dated Aug. 27, 2020 (6 p.).
Japanese Office Action dated Jul. 12, 2021, for Japanese Application No. 2018-108260 (7 p.).
English Translation of Japanese Office Action dated Jul. 12, 2021, for Japanese Application No. 2018-108260 (7 p.).
Chinese Office Action dated Jan. 10, 2022, for Chinese Application No. 201980037700.9 (4 p.).
English Translation of Chinese Office Action dated Jan. 10, 2022, for Chinese Application No. 201980037700.9 (6 p.).
Chinese Office Action dated Jun. 20, 2022, for Chinese Application No. 201980037700.9 (12 p.).

* cited by examiner

FLUID CONTROL VALVE AND EVAPORATED FUEL PROCESSING DEVICE

CROSS-REFERENCE TO RELATED APPLICATIONS

The present application is a 35 U.S.C. § 371 U.S. National Phase entry of, and claims priority to, PCT Application No. PCT/JP2019/020908, filed May 27, 2019, which claims priority to Japanese Patent Application No. 2018-108260, filed Jun. 6, 2018, both of which are incorporated herein by reference in their entireties for all purposes.

STATEMENT REGARDING FEDERALLY SPONSORED RESEARCH OR DEVELOPMENT

Not applicable.

BACKGROUND

The present disclosure relates generally to fluid control valves and evaporated fuel processing devices using the same.

An evaporated fuel processing device for preventing the leakage of evaporated fuel into the atmosphere is provided in a vehicle, such as an automobile. The evaporated fuel processing device is provided with a fluid control valve. The fluid control valve may also be referred to as a sealing valve (e.g., see Japanese Patent No. 6,275,633).

The fluid control valve described in Japanese Patent No. 6,275,633 includes an electric valve and a relief valve. The electric valve and the relief valve are housed in a valve casing of the fluid control valve. In the evaporative fuel processing device, a main passage forming a purge passage through which the evaporated fuel flows is formed in the valve casing. The main passage includes a first valve port, and a first valve chamber is provided on the downstream side of the first valve port. The electric valve is disposed in the main passage, and opens and closes the first valve port by electric control.

A bypass passage for bypassing the first valve port of the main passage is formed in the valve casing. The bypass passage includes a second valve port and a second valve chamber on the downstream side of the second valve port. The relief valve is disposed in the bypass passage, and opens and closes the second valve port.

The relief valve includes a positive pressure relief valve mechanism and a negative pressure relief valve mechanism. The relief valve is arranged so as to branch the main passage at a position upstream of the first valve port. The positive pressure relief valve mechanism opens when the pressure of the main passage on the upstream side of the first valve port is equal to or greater than a predetermined positive pressure value. The negative pressure relief valve mechanism opens when the pressure of the main passage on the upstream side of the first valve port is equal to or less than a predetermined negative pressure value.

The electric valve and the relief valve are disposed in the valve casing of the fluid control valve so that their axial directions are different from one another. As a result, the fluid control valve is miniaturized.

BRIEF SUMMARY

In accordance with an aspect of the present disclosure, a fluid control valve may comprise a valve casing, an electric valve, and a relief valve. The valve casing may include a main passage having a first valve port, a bypass passage bypassing the first valve port and having a second valve port, a first valve chamber in fluid communication with a downstream side of the first valve port, and a second valve chamber in fluid communication with the downstream side of the second valve port. The electric valve may be provided in the first valve chamber and be configured to open and close the first valve port by electric control. The relief valve may be provided in the second valve chamber. The relief valve may include a positive pressure relief valve mechanism configured to open when the pressure in the main passage on an upstream side of the first valve port is equal to or higher than a predetermined positive pressure value, and a negative pressure relief valve mechanism configured to open when the pressure in the main passage on the upstream side of the first valve port is equal to or less than a predetermined negative pressure value. The electric valve and the relief valve may be arranged so that their axial directions are different from one another. The bypass passage may include the communication passage in fluid communication with the first valve chamber and the second valve chamber. The communication passage may open into at least one of the side surfaces of the first valve chamber and/or the second valve chamber.

According to the above aspect, the electric valve and the relief valve may be arranged so that their axial directions are different from one another. As a result, the dimension or length measured in a direction parallel to the axial direction of the relief valve may be shortened, and the fluid control valve may be miniaturized.

Further, the opening of the communication passage of the bypass passage, which connects the first valve chamber of the electric valve and the second valve chamber of the relief valve, may open into the side surface of the valve chamber. Therefore, the size in the radial direction may be shortened, as compared with the case where the opening opens into the outside, in the radial direction, of the seat surface of the valve port. As a result, the size of the fluid control valve may be miniaturized, thereby improving the mountability on the vehicle.

DETAILED DESCRIPTION

The bypass passage of the fluid control valve described in Japanese Patent No. 6,275,633 has a communication passage for communicating the first valve chamber with the second valve chamber. An opening in the communication passage connecting the first and second valve chambers is radially offset to one side of the seat surface forming the valve port in the respective valve chambers. As a result, the size of the valve in the radial direction increases, thereby undesirably increasing the restrictions on the mounting location on the vehicle. An evaporated fuel processing device using a fluid control valve is usually disposed below the floor surface of the vehicle. As a result, there are space restrictions on the placement location at the bottom of the floor. There are also restrictions, such as interference with other equipment due to the placement, so it may be desirable to reduce the size of the evaporated fuel processing device as much as reasonably possible.

Hereinafter, embodiments of the present disclosure will be described with reference to the figures. Embodiments of the fluid control valves disclosed herein are provided for a fuel tank and an internal combustion engine, in particular for an evaporated fuel processing device mounted on a vehicle, such as an automobile equipped with an engine. For example, the fluid control valve may be used as a sealing valve for an evaporated fuel processing device. For convenience of explanation, the evaporated fuel processing device will be described, and then the sealing valve, also referred to as the fluid control valve, will be described.

Figure 1:
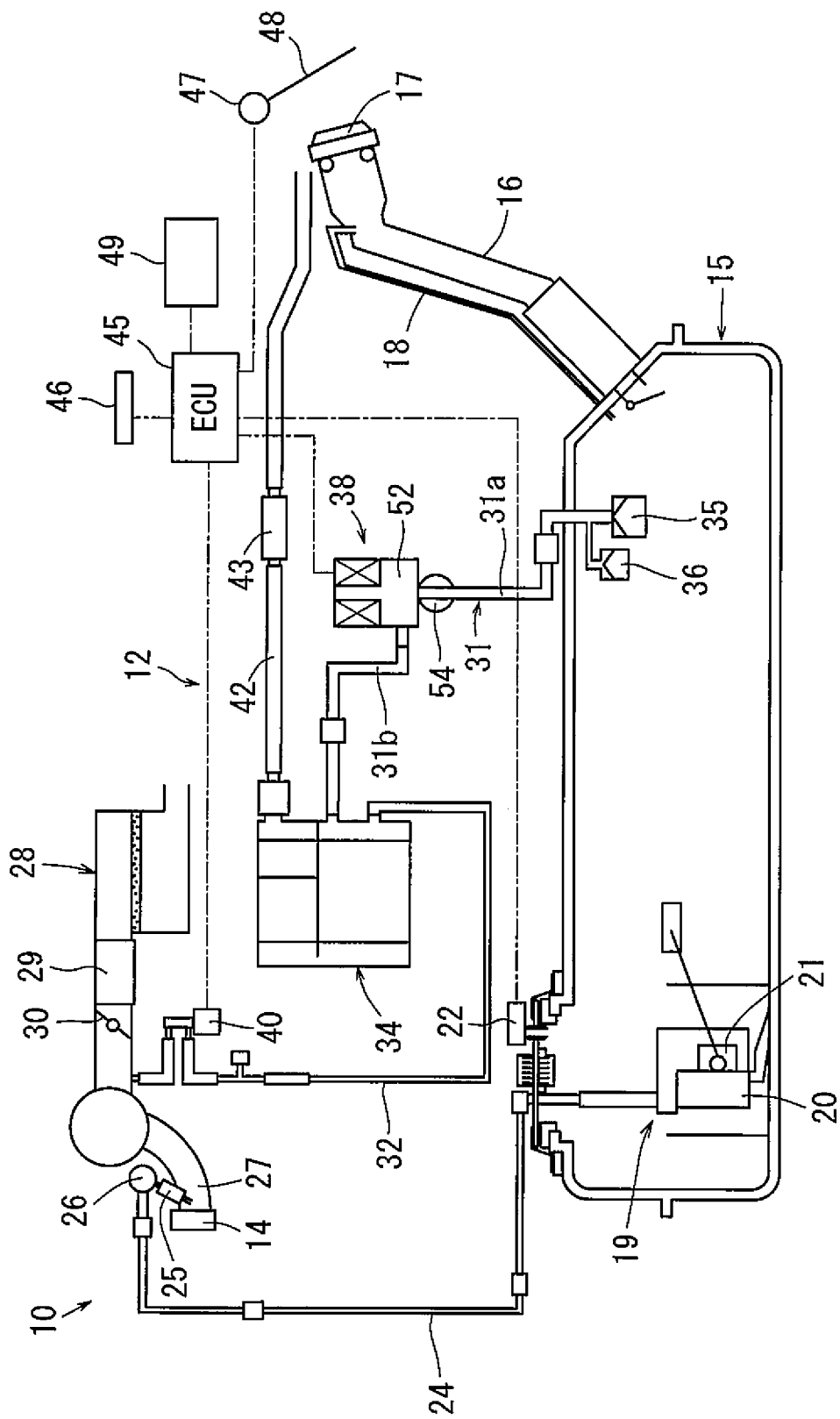
FIG. 1 is a schematic view of an evaporated fuel processing device according to an embodiment of the present disclosure.

FIG. 1 shows an embodiment of an evaporated fuel processing device 12. The evaporated fuel processing device 12 is included in an engine system 10 of a vehicle, such as an automobile. The engine system 10 includes an engine 14 and a fuel tank 15 that stores fuel to be supplied to the engine 14. An inlet pipe 16 is connected to the fuel tank 15. The inlet pipe 16 supplies fuel into the fuel tank 15 from an oil supply port at the upper end thereof. A tank cap 17 is removably attached to the oil supply port of the inlet pipe 16. The fuel tank 15 includes a breather pipe 18 that provides fluid communication between an upper end of the inlet pipe 16 and an air layer portion in the fuel tank 15 where the evaporated fuel exists.

The fuel tank 15 houses a fuel supply device 19 therein. The fuel supply device 19 includes a fuel pump 20, a sender gauge 21, a tank internal pressure sensor 22, and the like. The fuel pump 20 suctions and pressurizes the fuel in the fuel tank 15, and then discharges the fuel. The sender gauge 21 detects the liquid level of fuel in the fuel tank 15. The tank internal pressure sensor 22 detects a tank internal pressure relative to atmospheric pressure. The fuel pumped up from the fuel tank 15 by the fuel pump 20 is supplied to the engine 14 via a fuel supply passage 24. Specifically, fuel is supplied to a delivery pipe 26 provided with an injector 25 corresponding to each combustion chamber. The fuel is then injected from each injector 25 into a corresponding branch in an intake passage 27. An air cleaner 28, an air flow meter 29, a throttle valve 30, and the like are provided in the intake passage 27.

The evaporated fuel processing device 12 includes a vapor passage 31, a purge passage 32, and a canister 34. The upstream end of the vapor passage 31 is in fluid communication with an air layer portion in the fuel tank 15. The downstream end of the vapor passage 31 is in fluid communication with the inside of the canister 34. An upstream end of the purge passage 32 is in fluid communication with the inside of the canister 34. The downstream end of the purge passage 32 is in fluid communication with the intake passage 27 at a position downstream of the throttle valve 30. The canister 34 is filled with activated carbon (not shown) that functions as an adsorbent. The evaporated fuel in the fuel tank 15 is introduced into the canister 34 through the vapor passage 31 and adsorbed by the adsorbent in the canister 34.

In the air layer portion of the fuel tank 15, an ORVR valve (Onboard Refueling Vapor Recovery valve) 35 and a fuel cutoff valve 36 are provided at the upstream end part of the vapor passage 31.

The fluid control valve is positioned within the middle of the vapor passage 31. In the embodiment shown in FIG. 1, the fluid control valve is a sealing valve 38. That is, the vapor passage 31 is divided into a fuel tank side passage 31a and a canister side passage 31b. The sealing valve 38 is positioned between the fuel tank side passage 31a and the canister side passage 31b. The sealing valve 38 includes an electric valve 52 and a relief valve 54. The electric valve 52 is opened and closed by electrical control, so as to adjust the flow rate of a gas containing evaporated fuel flowing through the vapor passage 31 (hereinafter, referred to as "fluid"). The electric valve 52 is opened and closed based on a drive signal output from an engine control unit 45 (hereinafter referred to as "ECU"). The relief valve 54 is provided in a bypass passage, as will be described in more detail below. The relief valve 54 is configured to keep the pressure in the fuel tank 15 within a proper range when the electric valve 52 is closed.

A purge valve 40 is positioned in the middle of the purge passage 32. The degree of valve opening of the purge valve 40 is controlled according to the purge flow rate calculated by the ECU 45. In some embodiments, the purge valve 40 may be a solenoid valve, including an electromagnetic solenoid. In such embodiments, the purge valve 40 is closed in a non-energized state and opened in an energized state. In other embodiments, the purge valve 40 may instead be a motor valve having a stepping motor and a degree of valve opening configured to be adjusted by controlling the position of the valve element.

One end of an atmospheric passage 42 is in fluid communication with the canister 34. The other end of the atmospheric passage 42 is opened to the atmosphere. An air filter 43 is positioned in the middle of the atmospheric passage 42.

The ECU 45 is connected to the tank internal pressure sensor 22, the electric valve 52 of the sealing valve 38, the purge valve 40, a lid switch 46, a lid opener 47, a display device 49, etc. A lid manual opening/closing device (not shown) for manually opening and closing a lid 48 covering the oil supply port may be connected to the lid opener 47. The lid switch 46 outputs a lock release signal corresponding to the state of the lid 48 to the ECU 45. The lid opener 47 may function as a lock mechanism of the lid 48. The lid opener 47 is configured to release the locked state of the lid 48 when the lock release signal is received from the ECU 45 or when the lid manual opening/closing device is opened.

The basic operation of the evaporated fuel processing device 12 will be described. In a normal time, the relief valve 54 of the sealing valve 38 is closed.

(1) When the vehicle is parked, the electric valve 52 of the sealing valve 38 is maintained in a closed state. Therefore, the evaporated fuel does not flow into the canister 34 from the fuel tank 15. Also, air does not flow into the fuel tank 15 from the canister 34. At this time, the purge valve 40 is maintained in a closed state. The relief valve 54 of the sealing valve 38 maintains the pressure in the fuel tank 15 within a proper range when the electric valve 52 is closed when the vehicle is parked.

(2) When a predetermined purge condition has been established while the vehicle is running, the ECU 45 controls to purge the evaporated fuel adsorbed by the canister 34. During this control, the purge valve 40 is opened. When the purge valve 40 is opened, negative intake pressure of the engine 14 acts on the canister 34 via the purge passage 32. As a result, the evaporated fuel is supplied from the canister 34 to the intake passage 27, together with the air sucked from the atmospheric passage 42. Then evaporated fuel in the intake passage 27 is then burned by the engine 14. The ECU 45 opens the electric valve 52 of the sealing valve 38 only while purging the evaporated fuel. Thus, the tank internal pressure of the fuel tank 15 is maintained at a value near atmospheric pressure.

(3) When the lid switch 46 is operated while the vehicle is stopped, the ECU 45 sets the electric valve 52 of the sealing valve 38 to an open state. At this time, when the internal pressure of the fuel tank 15 is higher than atmospheric pressure, the electric valve 52 of the sealing valve 38 is opened. At the same time, the evaporated fuel may flow from the fuel tank 15 into the canister 34, via the vapor passage 31, and is adsorbed by the adsorbent in the canister 34. Therefore, the evaporated fuel is prevented from being released into the atmosphere. Along with this, the internal pressure of the fuel tank 15 drops to a value near atmospheric pressure. When the internal pressure of the fuel tank 15 drops to a value near atmospheric pressure, the ECU 45 outputs a lock release signal to the lid opener 47 of the lid 48. The lid opener 47, after receiving the signal, releases the lock state of the lid 48. As a result, the lid 48 is opened. Then, after the lid 48 is opened, the tank cap 17 can be removed and refueling of the fuel tank 15 may be started. The ECU 45 maintains the electric valve 52 of the sealing valve 38 in an open state until the end of refueling (specifically, until after the lid 48 has been closed). Therefore, during refueling, the evaporated fuel may flow from the fuel tank 15 into the canister 34 through the vapor passage 31 and be adsorbed by the adsorbent in the canister 34.

Figure 2:
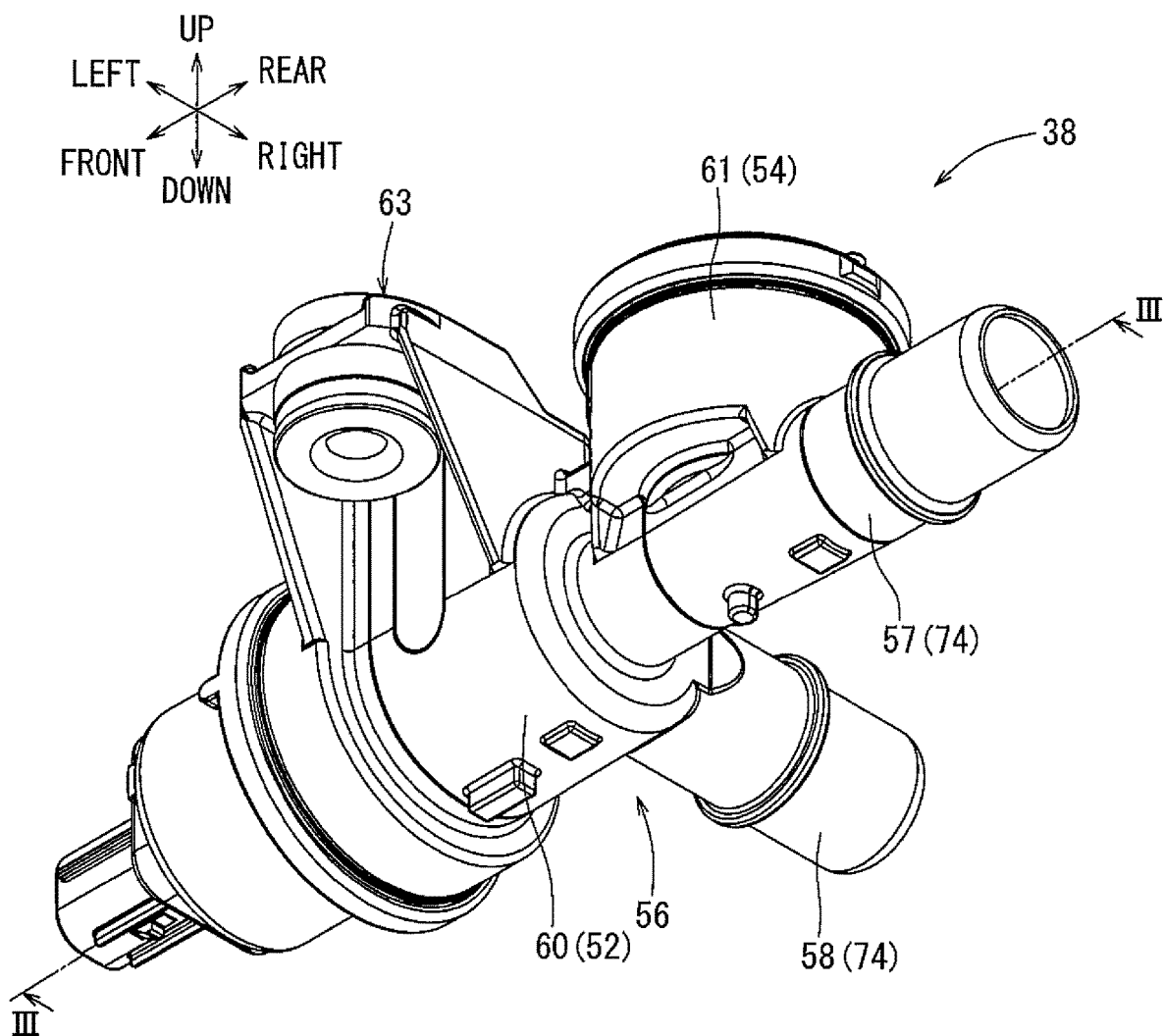
FIG. 2 is a perspective view of the sealing valve of the evaporated fuel processing device of FIG. 1.
Figure 3:
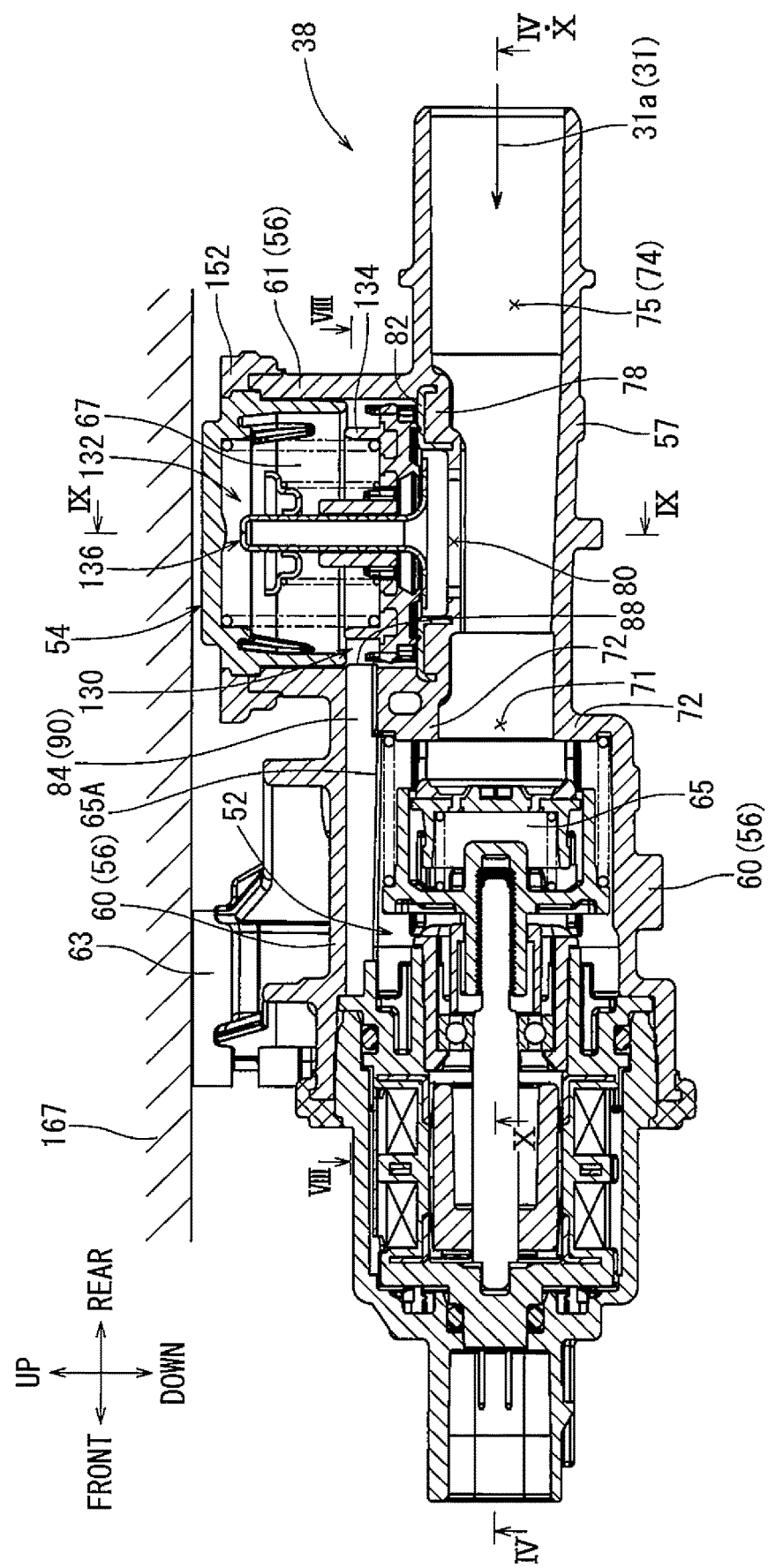
FIG. 3 is a cross-sectional view of the sealing valve of FIG. 2 taken along line III-III of FIG. 2.
Figure 4:
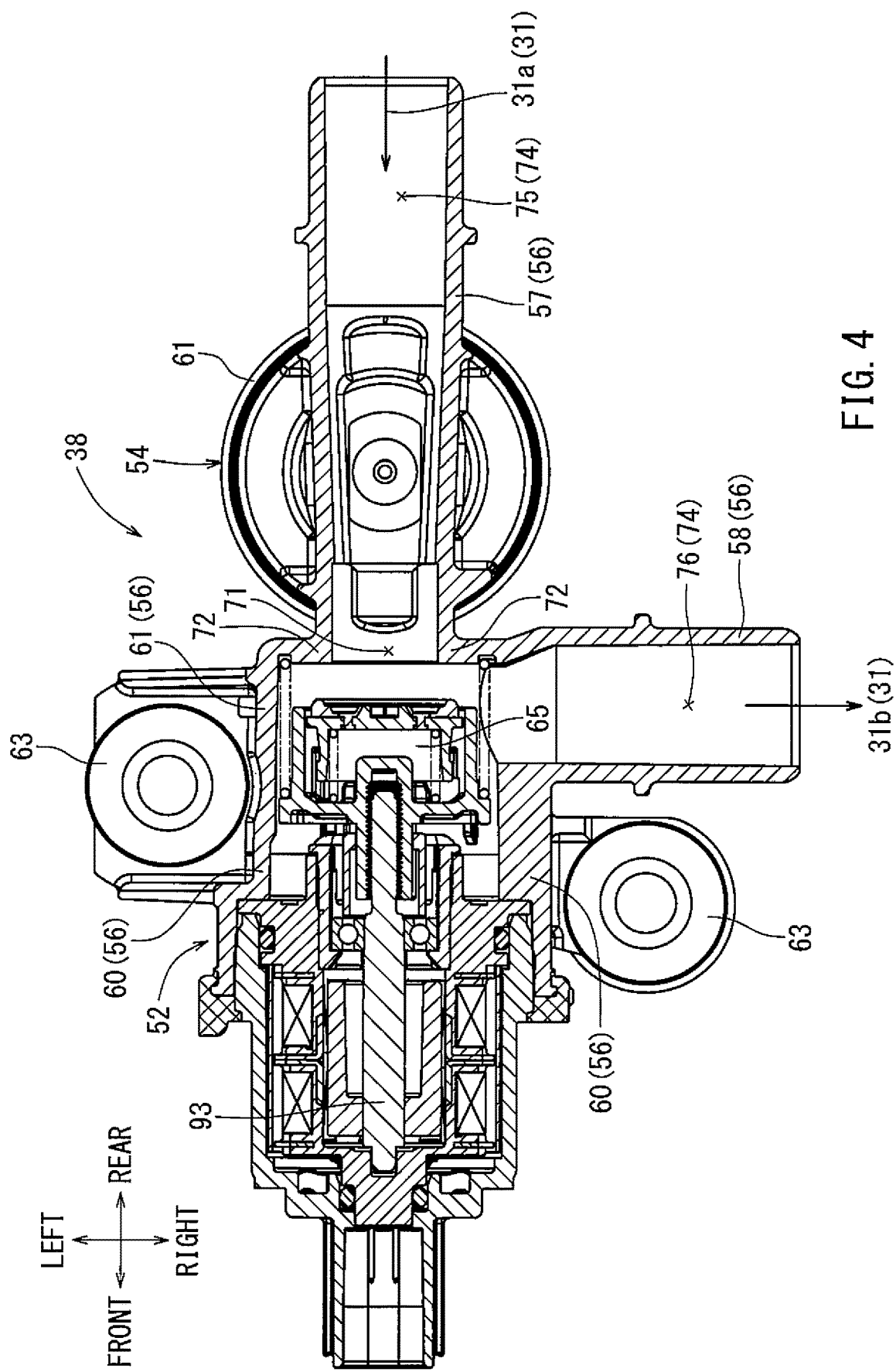
FIG. 4 is a cross-sectional view of the sealing valve of FIG. 2 taken along line IV-IV of FIG. 3.

The sealing valve 38 will now be described. FIG. 2 is a perspective view of the sealing valve 38. FIGS. 3 and 4 are cross-sectional views of the sealing valve 38. FIG. 3 is a sectional view taken along line in FIG. 2, and FIG. 4 is a sectional view taken along line IV-IV in FIG. 3. As shown in FIGS. 3 and 4, the sealing valve 38 include the electric valve 52, the relief valve 54, and a valve casing 56. Since the sealing valve 38 is normally installed under the floor of the vehicle, the direction shown in each figure has been set to correspond to the longitudinal and lateral directions of the vehicle. However, these directions should not be interpreted as limiting the arrangement direction of the sealing valve 38.

The valve casing 56 is made of, for example, resin. As shown in FIGS. 3 and 4, the electric valve 52 and the relief valve 54 are housed inside the valve casing 56. The valve casing 56 includes a first housing tubular part 60 for housing the electric valve 52 and a second housing tubular part 61 for housing the relief valve 54. The valve casing 56 is provided with a first pipe part 57 and a second pipe part 58. The first pipe part 57 and the second pipe part 58 define a main passage 74 in the valve casing 56. The main passage 74 correspond to a portion of the vapor passage.

The first pipe part 57 and the second pipe part 58 have hollow cylindrical shapes. The first pipe part 57 is oriented in the longitudinal direction (i.e., generally along the length of the casing 56 and the sealing valve 38), and the second pipe part 58 is oriented in the lateral or radial direction (i.e., generally perpendicular to the longitudinal direction of the casing 56 and the sealing valve 38).

Further, the valve casing 56 includes an attaching part 63 for attaching the sealing valve 38 to the underfloor surface of the vehicle. As shown in FIGS. 2 and 3, the attaching part 63 is integrally formed at an upper part of the first housing tubular part 60 forming the electric valve 52. As shown in FIG. 4, the attaching part 63 is attached to a vehicle floor surface at both right and left side positions of the first housing tubular part 60. The attaching part 63 of the right side is positioned slightly ahead of the attaching part 63 of the left side.

As shown in FIGS. 3 and 4, the first housing tubular part 60 forming the electric valve 52 has a stepped cylindrical shape, in which the diameter gradually increases moving from the front-end part of the first pipe part 57 toward the front. The first pipe part 57 and the first housing tubular part 60 are concentrically arranged. A first valve chamber 65 is formed in a rear end part of the first housing tubular part 60. The second pipe part 58 has a hollow cylindrical shape and extends from the first valve chamber 65 of the first housing tubular part 60 to a right side.

As shown in FIG. 3, the second housing tubular part 61 is formed in a bottomed cylindrical shape on the upper side of the front-end part of the first pipe part 57. As shown in FIG. 4, the second housing tubular part 61 has an outer diameter approximately twice the outer diameter of the first pipe part 57. The axial line of the second housing tubular part 61 is oriented orthogonal to the axial line of the first pipe part 57. That is, the second housing tubular part 61 is formed at a position directly above the first pipe part 57. As shown in FIG. 3, the second housing tubular part 61 defines a second valve chamber 67 inside.

As shown in FIG. 4, the first pipe part 57 and the second pipe part 58 have the same or substantially the same pipe diameter. The inside of the first pipe part 57 and the second pipe part 58 communicate with each other via the first valve chamber 65. An opening on the side of the first valve chamber 65 of the first pipe part 57 defines a first valve port 71. The inner diameter of the first valve port 71 is slightly smaller than the inner diameter of the first part pipe 57. A rim of the first valve port 71 defines a first valve seat 72. The inside of the first pipe part 57 defines the first passage 75, which extends along the same direction as the axial direction of the first valve port 71. The inside of the second pipe part 58 defines the second passage 76 extending to the right. The main passage 74 has an L-shape defined by the first passage 75, the second passage 76, and a part of the first valve chamber 65.

As shown in FIG. 3, an annular stepped part 78 for reducing an inner diameter is concentrically formed at the lower end of the second housing tubular part 61, which forms the second valve chamber 67 of the relief valve 54. A central opening of the stepped part 78 defines a second valve port 80, which provides fluid communication between the first passage 75 and the second valve chamber 67 in the second housing tubular part 61. A second valve seat 82 is concentrically disposed on the upper end surface on the side of the second valve chamber 67 of the stepped portion 78. The second valve seat 82 may be made of, for example, metal, and may have an annular plate shape. The second valve seat 82 is partially embedded in the stepped part 78. The second valve seat 82 is a seat surface of the relief valve 54.

As shown in FIG. 3, the valve casing 56 includes a bypass passage 90 bypassing the main passage 74. The bypass passage 90 includes the second valve port 80, the second valve chamber 67, the communication passage 84, and the first valve chamber 65. The communication passage 84 provides fluid communication between the second valve chamber 67 and the first valve chamber 65. Thus, the bypass passage 90 bypasses the first valve port 71 of the main passage 74. The bypass passage 90 is a passage for adjusting abnormal positive pressure and negative pressure in the fuel tank by operation of the relief valve 54 when the main passage 74 is closed by the electric valve 52.

Figure 5:
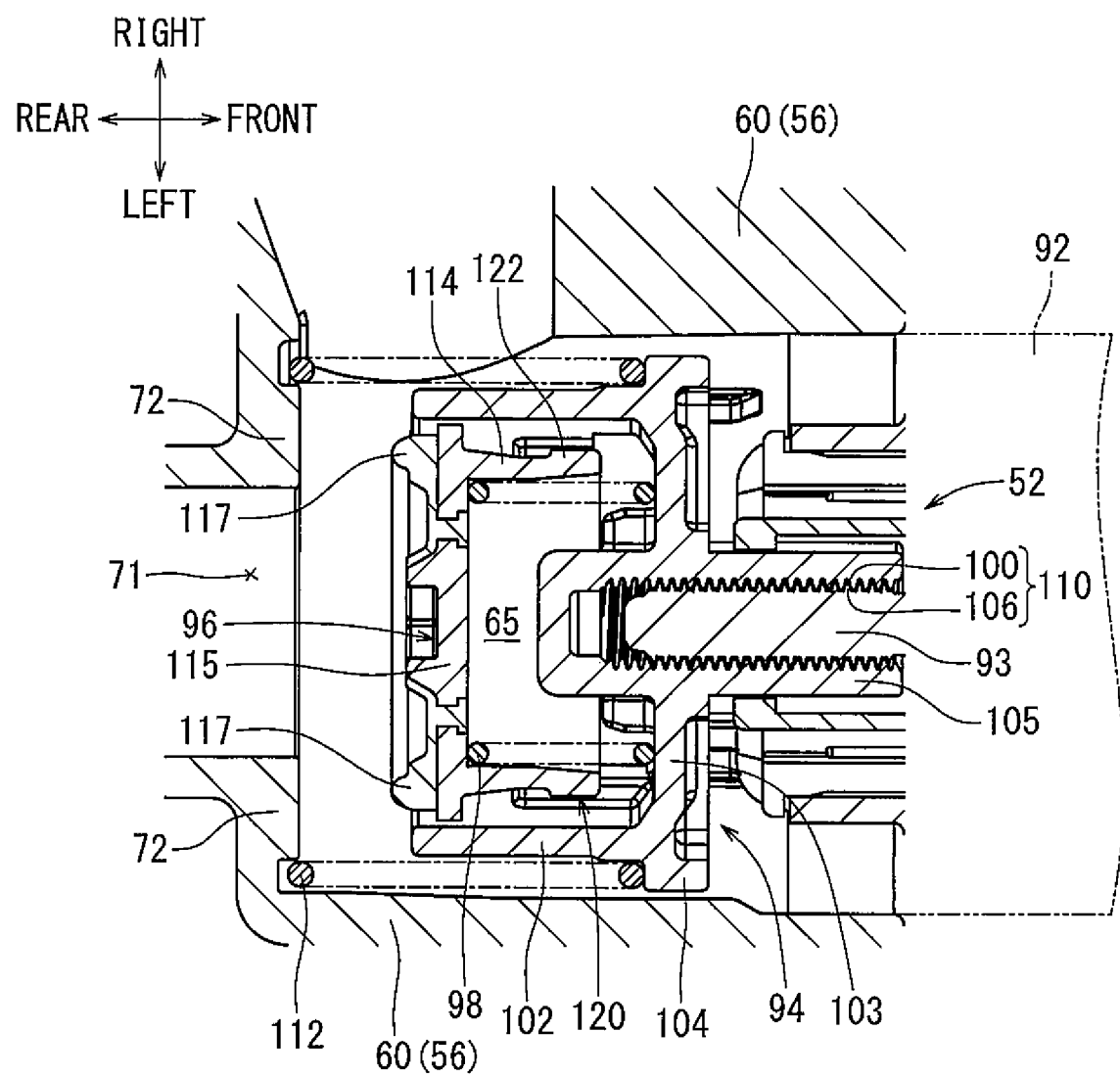
FIG. 5 is a cross-sectional view of the electric valve disposed in the sealing valve of FIG. 2.
Figure 6:
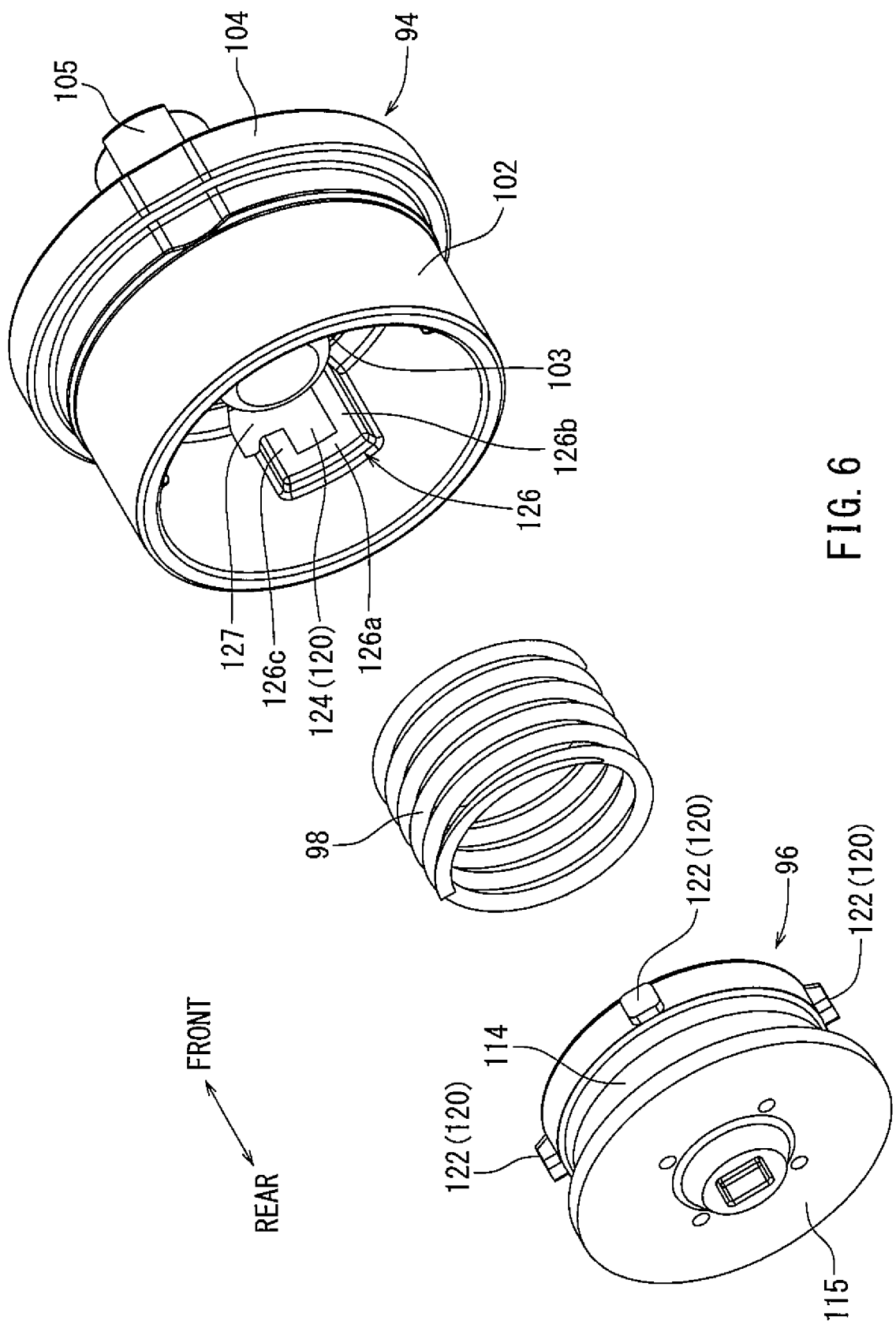
FIG. 6 is an exploded perspective view of a main component of the electric valve of the sealing valve of FIG. 2.

The configuration of the electric valve 52 will now be described. FIG. 5 is an enlarged cross-sectional view of a part of the electric valve 52. FIG. 6 is an exploded perspective view of the electric valve 52. As shown in FIG. 5, the electric valve 52 is housed in the first housing tubular part 60 of the valve casing 56. The electric valve 52 includes a stepping motor 92, a valve guide 94, a valve element 96, and a valve spring 98. FIG. 5 shows a valve opening state of the electric valve 52.

The stepping motor 92 is installed in the first housing tubular part 60, with its axial direction oriented in the longitudinal direction. The stepping motor 92 has an output shaft 93 that can rotate forward and in reverse. The output shaft 93 is directed to the rear side and is oriented so as to be concentric with the first valve chamber 65 of the first housing tubular part 60. A male screw part 100 is formed on the outer peripheral surface of the output shaft 93.

As shown in FIG. 6, the valve guide 94 has a cylindrical tubular wall part 102 and an end wall part 103 that closes the front end of the tubular wall part 102. On the outer peripheral surface of the front-end part of the cylindrical tubular wall part 102, an extension part 104 having an enlarged outer diameter is formed in a stepped cylindrical shape. A tubular shaft part 105 is concentrically formed at the center of the end wall part 103. The rear end of the tubular shaft part 105 is closed. As shown in FIG. 5, a female screw part 106 is formed on the inner peripheral surface of the tubular shaft part 105.

The valve guide 94 is movable in an axial direction, that is, in a longitudinal direction with respect to the inside of the first valve chamber 65. A detent means (not shown) prevents the valve guide 94 from rotating in the axial direction with respect to the first housing tubular part 60. The extension part 104 of the valve guide 94 is positioned such that at a predetermined gap is provided from an inner wall surface of the first valve chamber 65. The female screw part 106 of the tubular shaft part 105 is screwed to the male screw part 100 of the output shaft 93 of the stepping motor 92. Accordingly, the valve guide 94 can be moved in the longitudinal direction, based on the forward and reverse rotation of the output shaft 93. A feed screw mechanism 110 includes the male screw part 100 of the output shaft 93 and the female screw part 106 of the valve element 96.

An auxiliary spring 112, comprising a coil spring, is interposed between the first valve seat 72 of the valve casing 56 and the extension part 104 of the valve guide 94. The auxiliary spring 112 is positioned around the tubular wall part 102. The auxiliary spring 112 biases the valve guide 94 forward to suppress backlash of the feed screw mechanism 110. The rear end surface of the tubular wall part 102 is in contact with the first valve seat 72.

As shown in FIG. 6, the valve element 96 may have a tubular part 114 and a valve plate part 115, which closes the rear end opening part of the tubular part 114. As shown in FIG. 5, an annular first seal member 117 made of a rubber-like elastic material may be mounted on the valve plate part 115.

As shown in FIG. 5, the valve element 96 arranged concentrically in the valve guide 94, and is movable in the front-rear direction. The first seal member 117 faces the first valve seat 72, so as to be in contact with the first valve seat 72. Between the valve guide 94 and the valve element 96, a plurality of sets (for example, four sets) of connecting means 120 are provided. The valve guide 94 and the valve element 96 can move relative to each other in the longitudinal direction, within a predetermined range of motion, by the connecting means 120. Each connecting means 120 includes an engaging projection 122 provided in the tubular part 114 of the valve element 96 and an engaging groove 124 provided in a tubular wall part 102 of the valve guide 94. As shown in FIG. 6, the connecting means 120 are uniformly circumferentially spaced.

As shown in FIG. 6, the engaging projection 122 extends radially outward from the front end of the outer peripheral surface of the tubular part 114 of the valve element 96. A groove forming wall 126 projects radially inward on an inner peripheral surface of a tubular wall part 102 of the valve guide 94. Each groove forming wall 126 has a rear wall part 126a, a long side wall part 126b, and a short side wall part 126c. The rear wall part 126a extends perpendicular to the longitudinal direction. The long side wall part 126b extends from one end of the rear wall part 126a to the end wall part 103. The short side wall part 126c extends forward from the rear wall part 126a. The rear wall part 126a, the long side wall part 126b, and the short side wall part 126c form the engaging groove 124 in the tubular wall part 102. The engaging groove 124 has an opening and extends in the longitudinal direction. An opening 127 is formed between the short side wall part 126c and the end wall part 103. The engaging projection 122 engages the engaging groove 124 after passing through the opening 127 of the groove forming wall 126. As a result, the valve body 96 is movably coupled to the valve guide 94 within a predetermined range of motion in the longitudinal direction, while the valve body 96 is prevented from rotating in the circumferential direction.

As shown in FIGS. 5 and 6, the valve spring 98 comprises a coil spring. The valve spring 98 is concentrically aligned with and interposed between an end wall part 103 of the valve guide 94 and the valve plate part 115 of the valve element 96. The valve spring 98 biases the valve element 96 rearward, that is, in the closing direction.

Figure 7:
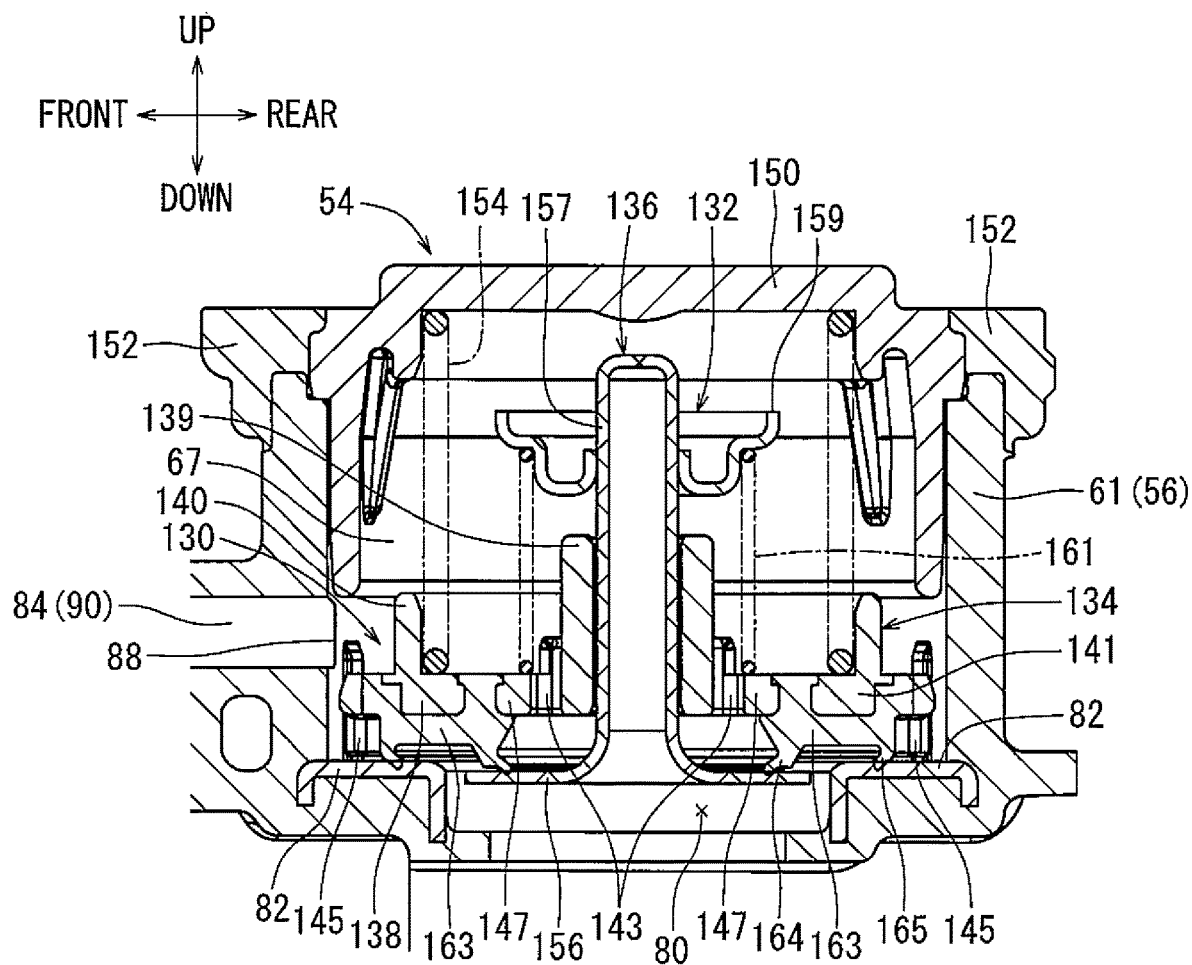
FIG. 7 is a cross-sectional view of the relief valve disposed in the sealing valve of FIG. 2.

The relief valve 54 will now be described. FIG. 7 is an enlarged cross-sectional view of the relief valve 54. The relief valve 54 has a positive pressure relief valve mechanism 130 and a negative pressure relief valve mechanism 132. In FIG. 7, the positive pressure relief valve mechanism 130 and the negative pressure relief valve mechanism 132 are in the closed state. The relief valve 54 is disposed in the second housing tubular part 61 of the valve casing 56.

The relief valve 54 has the positive pressure relief valve mechanism 130 and the negative pressure relief valve mechanism 132 concentrically arranged. A first valve member 134 of the positive pressure relief valve mechanism 130 and a second valve member 136 of the negative pressure relief valve mechanism 132 are arranged concentrically and are vertically movable in the second valve chamber 67 of the second housing tubular part 61.

The first valve member 134 includes an annular plate-shaped valve plate 138, an inner tubular part 139, and an outer tubular part 140, which are concentrically arranged. The inner tubular part 139 and the outer tubular part 140 have an inner and outer double tubular shape. The outer peripheral part of the valve plate 138 defines a first valve part 141 positioned above the second valve seat 82. When the first valve member 134 is separated from the second valve seat 82, the second valve port 80 is opened. When the first valve member 134 comes into contact with the second valve seat 82, the second valve port 80 is closed.

The inner tubular part 139 and the outer tubular part 140 are arranged in an upward fashion on the valve plate 138. A plurality of through-holes 143 (in FIG. 7, two through-holes), penetrating through the valve plate 138 in the vertical direction, are positioned radially outward of the inner tubular part 139. A plurality of uniformly circumferentially spaced stopper pieces 145 are disposed on the lower surface of the outer peripheral edge part of the first valve part 141. The stopper piece 145 abuts the second valve seat 82 when the first valve member 134 is closed. Thus, the valve closing position of the first valve member 134 can be regulated. An inner peripheral part of the valve plate 138 defines a third valve seat 147 of the negative pressure relief valve mechanism 132.

A cap 150 and a release preventing member 152 are positioned on an upper end opening part of the second housing tubular part 61. The cap 150 is made of, for example, resin, and may be formed in a disk shape. The cap 150 closes the upper end of the second housing tubular part 61. The release preventing member 152 may be made of, for example, resin, and may be formed in an annular shape. The release preventing member 152 is joined to the upper end part of the second housing tubular part 61 by welding or the like. The release preventing member 152 engages the outer peripheral part of the cap 150. Thus, the cap 150 is prevented from being released by the release preventing member 152.

A first coil spring 154 is positioned between and concentrically aligned with the valve plate 138 of the first valve member 134 and the cap 150. The first coil spring 154 biases the first valve member 134 downward, that is, in the valve closing direction. The first coil spring 154 is fitted into the outer tubular part 140 of the first valve member 134.

The second valve member 136 includes an annular valve plate 156 and a round shaft-shaped shaft part 157. The shaft part 157 of the second valve member 136 is fitted into the inner tubular part 139 of the first valve member 134 from below. The annular valve plate 156 closes the through-hole 143 by abutting the third valve seat 147 of the first valve member 134 from below. The annular valve plate 156 can move downward, and separate from the third valve seat 147, thereby opening the through-hole 143. An annular plate-shaped spring receiving member 159 is attached to the upper end of the shaft part 157. The spring receiving member 159 abuts the inner tubular part 139 of the first valve member 134 when the second valve member 136 is opened. Thus, the maximum valve opening amount of the second valve member 136 can be regulated.

A second coil spring 161 is disposed between and concentrically aligned with the valve plate 138 of the first valve member 134 and the spring receiving member 159. The inner tubular part 139 of the first valve member 134 is disposed in the second coil spring 161. The second coil spring 161 biases the second valve member 136 upward, that is, in the valve closing direction. The second coil spring 161 and the first coil spring 154 are arranged in an inner and outer double ring shape. The coil diameter, the coil length, and the coil wire diameter of the second coil spring 161 are set smaller than the coil diameter, the coil length, and the coil wire diameter of the first coil spring 154. Therefore, the energizing force of the second coil spring 161 is smaller than the energizing force of the first coil spring 154.

An annular second seal member 163 is attached to the lower surface of the valve plate 138 of the first valve member 134, such as by adhesion or the like. The second seal member 163 is made of a rubber-like elastic material, such as rubber. The second seal member 163 has an inner seal part 164 and an outer seal part 165 projecting into an inner and outer double ring shape on its lower surface side. The inner seal part 164 is opposed to the annular valve plate 156 of the second valve member 136. When the second valve member 136 is closed, the second valve member 136 is biased upward by the biasing force of the second coil spring 161. As a result, the annular valve plate 156 is elastically contacted, that is, brought into close contact, with the inner seal part 164 on the inner peripheral side. The outer seal part 165 is opposed to the second valve seat 82 of the valve casing 56. When the first valve member 134 is closed, the first valve member 134 is biased downward by the biasing force of the first coil spring 154. As a result, the outer seal part 165 is elastically contacted, that is, brought into close contact with, the second valve seat 82.

Next, the positive pressure relief valve mechanism 130 (see FIG. 7) will be described. In the positive pressure relief valve mechanism 130, the pressure value for opening the positive pressure side is set by the first coil spring 154. Thus, when the pressure on the side of the second valve port 80 (the side of the fuel tank) becomes equal to or higher than the pressure valve for opening the positive pressure side, the first valve member 134 moves (rises) against the biasing force of the first coil spring 154. As a result, the positive pressure relief valve mechanism 130 is opened. At this time, the outer seal part 165 is separated from the second valve seat 82.

The negative pressure relief valve mechanism 132 (see FIG. 7) will now be described. In the negative pressure relief valve mechanism 132, the pressure value for opening the negative pressure side is set by the second coil spring 161. Thus, when the pressure on the side of the second valve port 80 (the side of the fuel tank) becomes equal to or higher than the pressure valve for opening the negative pressure side, the second valve member 136 moves (descends) against the biasing force of the second coil spring 161. As a result, the negative pressure relief valve mechanism 132 is opened. At this time, the inner seal part 164 is separated from the annular valve plate 156 of the second valve member 136.

As shown in FIG. 1, the sealing valve 38 is interposed in the vapor passage 31 of the evaporated fuel processing device 12 mounted on a vehicle (not shown). That is, as shown in FIGS. 3 and 4, the fuel tank side passage 31a of the vapor passage 31 is connected to the first pipe part 57 of the valve casing 56, and the canister side passage 31b of the vapor passage 31 is connected to the second pipe part 58. Thus, the fuel tank side passage 31a and the canister side passage 31b of the vapor passage 31 are in fluid communication with each other through the main passage 74 of the valve casing 56. Therefore, the main passage 74 constitutes a part of the vapor passage 31. As shown in FIG. 3, the attaching part 63 of the valve casing 56 is fixed to a fixed side member 167 on the underfloor side of the vehicle by the fastening of a bolt or the like. Thus, the sealing valve 38 is mounted on the vehicle, so that the axial line of the relief valve 54 is directed in the vertical direction. The second valve port 80 of the relief valve 54 is arranged on the top side with respect to the main passage 74 in a vehicle-mounted state. That is, as shown in FIG. 3, the second valve port 80 is arranged at a position more upper than the portion of the main passage 74 formed by the first pipe part 57.

The operation of the electric valve 52 in the sealing valve 38 will now be described. The operation of the electric valve 52 can be performed in a valve open state, which is a state where the positive pressure relief valve mechanism 130 and the negative pressure relief valve mechanism 132 of the relief valve 54 are both closed.

The valve open state of the electric valve 52 will now be described. As shown in FIG. 5, in the valve open state of the electric valve 52, the valve guide 94 and the valve element 96, including the first seal member 117, are separated in the forward direction from the first valve seat 72 of the first housing tubular part 60. The valve element 96 is biased backward by the elasticity of the valve spring 98 relative to the valve guide 94. Therefore, the engaging projection 122 of the valve element 96 abut on the rear wall part 126a of the groove forming wall 126. As a result, the valve guide 94 and the valve element 96 are coupled to each other by the connecting means 120.

The valve guide 94 is stroke-controlled in the axial direction through a feed screw mechanism 110 driven by the drive control of the stepping motor 92, which is operated by the ECU 45 (see FIG. 1). Thus, the valve element 96 can move in the longitudinal direction, together with the valve guide 94, so that the valve opening amount of the valve element 96 can be adjusted. Further, even if the stepping motor 92 is turned off in the valve open state, the valve open state is maintained by the detent torque of the stepping motor 92 and the lead angle of the feed screw mechanism 110.

In the valve open state of the electric valve 52, the main passage 74 formed in the valve casing 56 is in a communicative state. That is, the portion of the main passage 74 of the first pipe part 57 connected to the fuel tank side passage 31a and the portion of the main passage 74 of the second pipe part 58 connected to the canister side passage 31b are in fluid communication with each other.

The valve closing operation of the electric valve 52 will now be described. When in the valve open state, the stepping motor 92 is operated to close the electric valve 52 by rotating the output shaft 93 in the valve closing direction. Thus, the valve guide 94 and the valve element 96 are moved backward by the feed screw mechanism 110. Then, the first seal member 117 of the valve element 96 contacts the first valve seat 72, thereby causing further backward movement of the valve element 96 to be restricted. Subsequently, the valve guide 94 can be moved further backward. As a result, the rear wall part 126a of the groove forming wall 126 of the valve guide 94 can move backward with respect to the engaging projection 122 of the valve element 96 as shown in FIG. 6.

When the tubular wall part 102 of the valve guide 94 is brought close to or in contact with the first valve seat 72 of the valve casing 56, the closing operation of the stepping motor 92 is stopped by the ECU 45. This state is the closed state. Further, the tubular wall part 102 of the valve guide 94 can be brought in contact with the first valve seat 72 of the valve casing 56. Then, the stepping motor 92 can be operated to open the valve by a predetermined amount. As a result, the valve guide 94 can be brought close to the first valve seat 72. This state is also the closed state.

The valve closed state of the electric valve 52 will now be described. In the valve closed state of the electric valve 52, the valve element 96 contacts the first valve seat 72 of the valve casing 56 due to the biasing force of the valve spring 98. The valve element 96 and the first valve seat 72 are elastically sealed by the first seal member 117. Further, even if the stepping motor 92 is turned off in the valve closed state, the valve closed state is maintained by the detent torque of the stepping motor 92 and the lead angle of the feed screw mechanism 110.

The valve opening operation of the electric valve 52 will now be described. When the stepping motor 92 is operated to open the electric valve 52 from the valve closed state, the output shaft 93 is rotated in the valve opening direction. Thus, the valve guide 94 is moved forward (in the opening direction) by the feed screw mechanism 110. Therefore, the engaging groove 124 of the valve guide 94 moves upward along with the engaging projection 122 of the valve element 96. As a result, the valve spring 98 and the auxiliary spring 112 extend due to their elastic restoring force. A rear wall part 126a of the groove forming wall 126 abuts the engaging projection 122 of the valve element 96. Thus, the relative movement between the valve guide 94 and the valve element 96 is restricted. Subsequently, the valve guide 94 and the valve element 96 can move further forward. Therefore, the auxiliary spring 112 extends due to its elastic restoring force. As a result, the first seal member 117 of the valve element 96 can be separated from the first valve seat 72 of the valve casing 56, thereby resulting in the valve open state.

The operation of the relief valve 54 of the sealing valve 38 will now be described. In the relief valve 54, the valve opening operation of the positive pressure relief valve mechanism 130 and the valve opening operation of the negative pressure relief valve mechanism 132 can be performed while the electric valve 52 is in the valve closed state.

The valve opening operation of the positive pressure relief valve mechanism 130 is performed when positive pressure, which is equal to or higher than the valve opening pressure of the positive pressure relief valve mechanism 130, is generated in the fuel tank 15. That is, when a positive pressure equal to or higher than the valve opening pressure is generated, the first valve member 134 is moved upward to open the positive pressure relief valve mechanism 130. Then, the first passage 75 and the second valve chamber 67 are in fluid communication with each other through the second valve port 80. Thus, even if the first valve port 71 is closed, the first passage 75 and the second passage 76 are in fluid communication with each other through the bypass passage 90. Therefore, the fluid can flow from the fuel tank 15 to the canister 34 via the first passage 75, the bypass passage 90, and the second passage 76. As a result, the pressure in the fuel tank 15 is reduced.

The valve opening operation of the negative pressure relief valve mechanism 132 is performed when negative pressure, which is equal to or less than the valve opening pressure of the negative pressure relief valve mechanism 132, is generated in the fuel tank 15. That is, when a negative pressure equal to or less than the valve opening pressure is generated, the second valve member 136 is moved downward to open the negative pressure relief valve mechanism 132. Then, the first passage 75 and the second valve chamber 67 are in fluid communication with each other though the second valve port 80. Thus, even if the first valve port 71 is closed, the first passage 75 and the second passage 76 are in fluid communication with each other through the bypass passage 90. Therefore, the fluid can flow from the fuel tank 15 to the canister 34 via the first passage 75, the bypass passage 90, and the second passage 76. Therefore, the fluid can flow from the canister 34 to the fuel tank 15 via the second passage 76, the bypass passage 90, and the first passage 75. As a result, the pressure in the fuel tank 15 may be increased.

Figure 8:
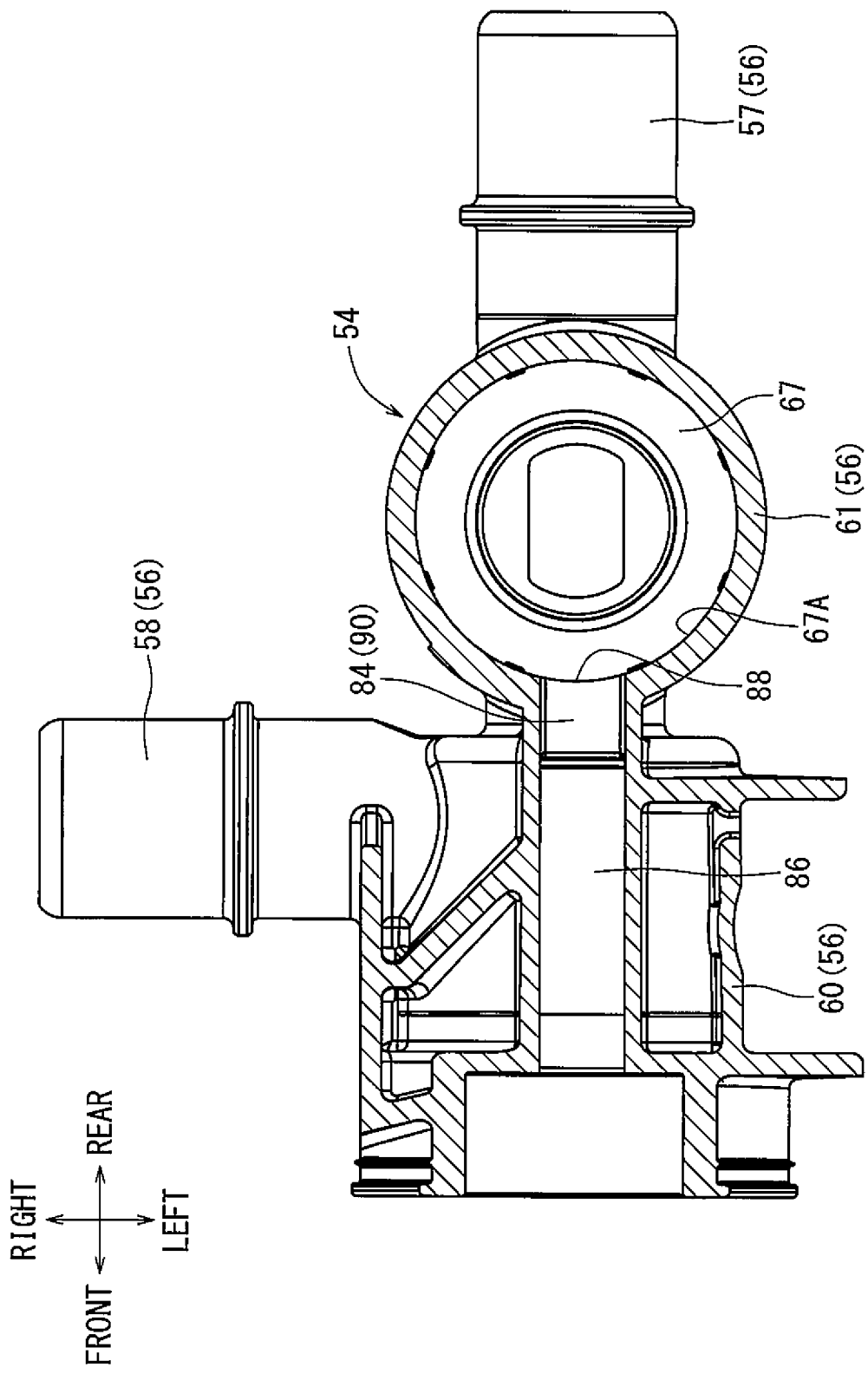
FIG. 8 is a cross-sectional view of the valve casing along line VIII-VIII of FIG. 3.
Figure 9:
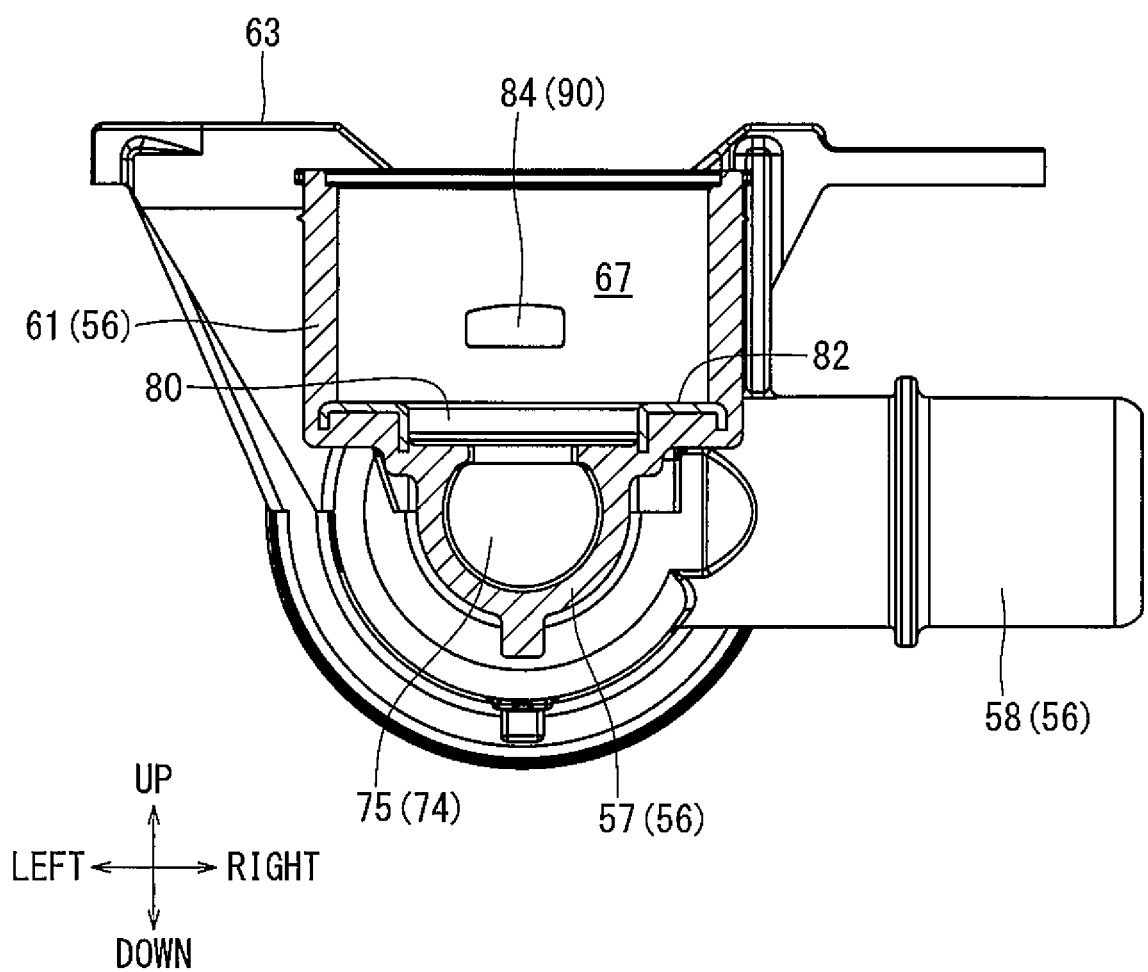
FIG. 9 is a cross-sectional view of the valve casing along the IX-IX line of FIG. 3.
Figure 10:
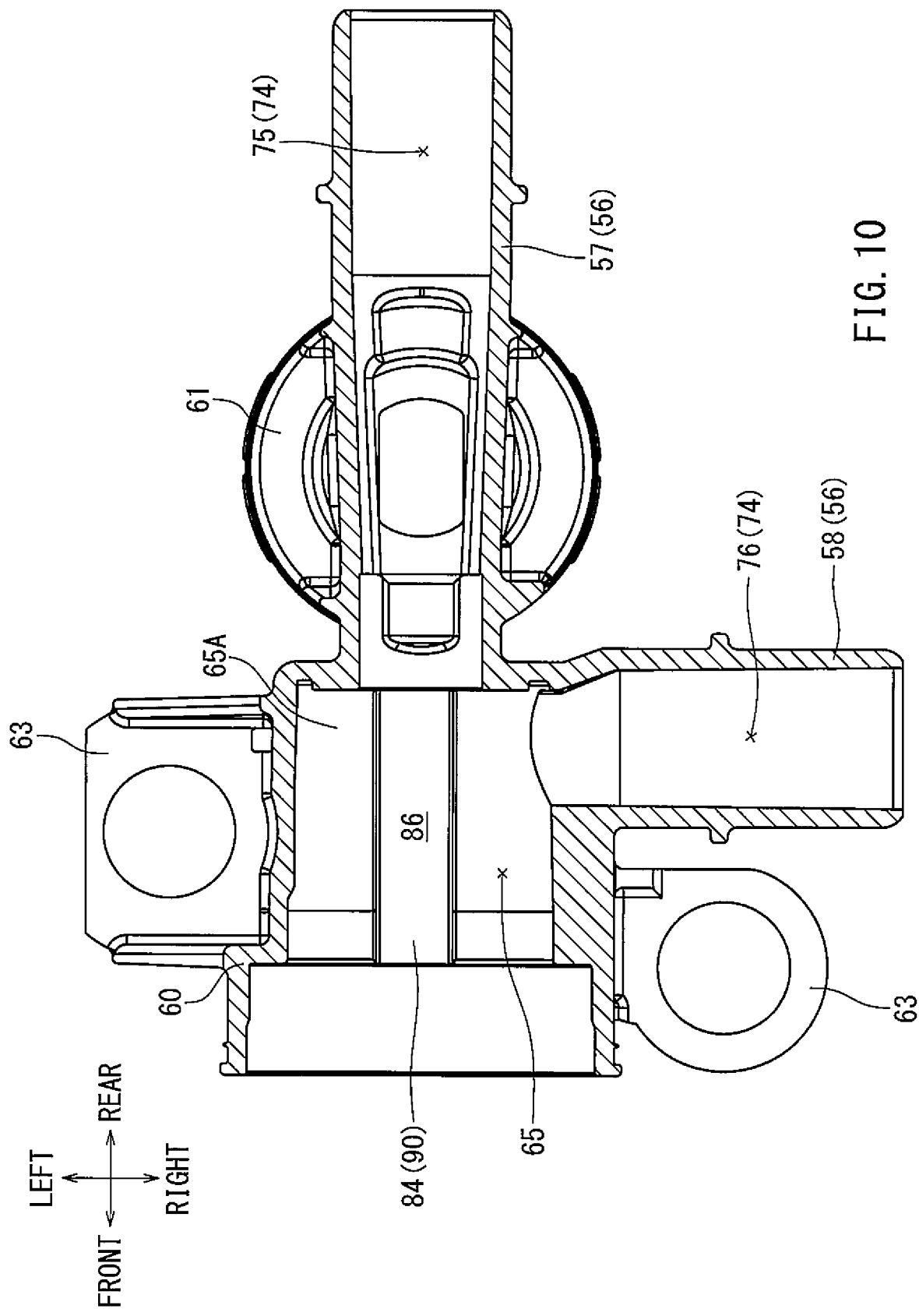
FIG. 10 is a cross-sectional view of the valve casing of the sealing valve of FIG. 2 along the X-X line of FIG. 3.

The communication passage 84 of the bypass passage 90 fluidly connects the second valve chamber 67 of the relief valve 54 and the first valve chamber 65 of the electric valve 52. The position of the communication passage 84 is shown in FIG. 3. FIGS. 8-10 are cross-sectional views of respective parts that form the communication passage 84 in the valve casing 56. FIG. 8 is a sectional view taken along line VIII-VIII of FIG. 3. FIG. 9 is a cross-sectional view taken along line IX-IX of FIG. 3. FIG. 10 is a cross-sectional view taken along line X-X of FIG. 3.

As shown in FIG. 3, the communication passage 84 is disposed at the upper position of the first passage 75 and oriented parallel to the axial direction of the portion of the first passage 75 formed by the first pipe part 57. As shown in FIG. 8, a relief valve side opening 88 of the communication passage 84 is formed in a second side surface 67A of a second valve chamber 67. The position of the relief valve side opening 88 is disposed slightly lower than the center of the second valve chamber 67 in the vertical direction, as shown in FIGS. 3 and 7. As shown in FIG. 9, the cross-sectional shape of the communication passage 84 can have a rectangular cross-sectional shape in the lateral direction.

As shown in FIG. 3, the communication passage 84 is positioned above the first housing tubular part 60 and oriented parallel with the axial direction of the first valve chamber 65. As shown in FIG. 10, the communication passage 84 has an electric valve side opening 86, which forms an opening in a first side surface (upper surface) 65A of the first valve chamber 65. The electric valve side opening 86 is located on the lower surface of the communication passage 84, and may have a wider opening area than the relief valve side opening 88.

A throttled passage of the bypass passage 90 is formed in the communication passage 84, between the relief valve side opening 88 and the electric valve side opening 86. Thus, the cross-sectional area of this region of the communication passage 84 is smaller than the minimum cross-sectional area of the passage portion on the upstream side of the second valve port 80 of the relief valve 54. As a result, when the positive pressure relief valve mechanism 130 of the relief valve 54 is opened, the fluid may flow relatively slowly from the first passage 75 to the second passage 76 via the bypass passage 90.

Figure 11:
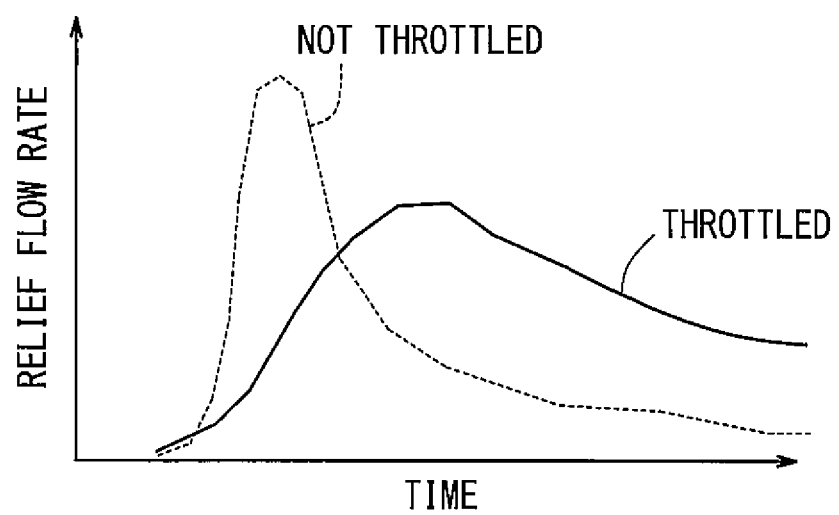
FIG. 11 is a diagram illustrating a relief flow rate of a communication passage in a bypass passage.

FIG. 11 is a characteristic diagram of a relief flow rate when the communication passage 84 is a throttled passage. The relief flow rate diagram shown by the solid line in FIG. 11 is the case where the communication passage 84 is "throttled," and the relief flow rate diagram shown by the broken line is the case where the communication is "not throttled." The relief flow rate within the communication passage 84 of the bypass passage 90 when the positive pressure relief valve mechanism 130 is opened follows that seen in the characteristic diagram shown in FIG. 11. That is, the relief flow rate in the case of "not throttled" may flow through the communication passage of the bypass passage within a short time of the positive pressure relief valve mechanism being opened. That is, a rapid change of flow rate may be generated. On the other hand, the relief flow rate in the case of "throttled" may be such that it is throttled when the positive pressure relief valve mechanism 130 opens. Therefore, the relief flow rate gently changes within the communication passage 84 over time. That is, a rapid change of flow rate may be suppressed. Therefore, the peak flow rate of the relief flow rate is also lower in the case of being "throttled" than in the case of being "not throttled." According to the experimental results of the discloser, the throttle diameter of the communication passage 84 is preferably 3.0 to 6.0 mm.

First, according to the above-described configuration of the present embodiment, the relief valve side opening 88 of the communication passage 84 at the relief valve 54 and the electric valve side opening 86 of the communication passage 84 at the electric valve 52 in the bypass passage 90 can open into the first side surface 65A of the first valve chamber 65 and the second side surface 67A of the second valve chamber 67, respectively. Therefore, the size in the radial direction and the size of the fluid control valve may be reduced, as compared with the case where the opening opens to the outside in the radial direction of the seat surface of the valve port such as is disclosed in in JP 6,275,633. As a result, mountability on the vehicle may be improved.

Next, the minimum cross-sectional area of the communication passage 84 can be formed so as to be smaller than the minimum cross-sectional area of the passage portion upstream of the second valve port of the relief valve 54, that is, smaller than the first passage 75 formed by the first pipe part 57. Thus, for the flow of fluid when the positive pressure relief valve mechanism 130 of the relief valve 54 is opened, excessive pressure fluctuations may be suppressed by the throttle action of the communication passage 84. Additionally, noise due to the evaporated fuel flow (gas flow) may be suppressed. That is, when the relief flow rate suddenly changes, the relief valve may vibrate vertically and horizontally, and sound may be generated by the vibrations. On the other hand, according to the configuration characterized by the present embodiment, since the changes in the relief flow rate are gradual, as described above, the valve behavior at the time of valve opening is stable. Accordingly, it is possible to suppress the generation of sound, due to a lack of vibrations in the up, down, left, and right directions.

According to the sealing valve 38 of the present embodiment, the electric valve 52 and the relief valve 54 are oriented so that their axial directions are different from each other (e.g., not aligned and not parallel). Specifically, the electric valve 52 is oriented so that its axial direction is generally parallel to the longitudinal direction (e.g., horizontal), and the relief valve 54 is oriented so that its axial direction is in the vertical direction generally perpendicular to the longitudinal direction. Thus, compared with the case where the axial line of the electric valve 52 and the axial line of the relief valve 54 are directed in the same direction, the dimension in the direction along the axial direction of the relief valve 54 (vertical direction) may be shortened, and the sealing valve 38 can be made more compact.

The main passage 74 having the first valve port 71 and the bypass passage 90 having the second valve port 80 are formed in the valve casing 56. Thus, the electric valve 52 and the relief valve 54 are integrated. This also allows the sealing valve 38 to be miniaturized.

The relief valve 54 is positioned on the downstream side (upper side in FIG. 3) of the second valve port 80. Therefore, as compared with a case where, for example, the relief valve 54 is arranged on the upstream side of the second valve port 80, the second valve port 80 and the main passage 74 are positioned in relatively close proximity to each other. Accordingly, the valve casing 56 can be miniaturized.

The main passage 74 includes the first passage 75 extending along the same direction (longitudinal direction) as the axial direction of the first valve port 71, and includes the second passage 76 extending along a direction (left and right direction) different from the axial direction of the first passage 75 on the opposite side to the first passage 75 side (rear side) of the first valve port 71 (see FIG. 4). Therefore, as compared with the case where the axial direction of the electric valve 52 and the axial direction of the linear main passage intersect orthogonally, the dimension in the direction along the axial direction (lateral direction) of the second passage 76 of the main passage 74 can be shortened. Accordingly, the sealing valve 38 can be miniaturized.

An elbow-shaped main passage 74 is formed by the first passage 75 and the second passage 76 (see FIG. 4). Therefore, the flow resistance (ventilation resistance) in the main passage 74 can be reduced, as compared with the case where, for example, the main passage is formed in a meandering shape.

The second valve port 80 of the relief valve 54 is positioned on the top side with respect to the main passage 74, in a vehicle mounted state. Therefore, the moisture and oil adhering to the seat surface of the second valve port 80 may fall into the main passage 74 under its own weight. Accordingly, freezing and material deterioration of the seat surface can be suppressed.

The sealing valve 38 is mounted on the vehicle so that the axial line of the relief valve 54 is oriented in the vertical direction. Therefore, fluctuations of the valve opening pressure of the relief valve 54 can be suppressed. For example, when the relief valve 54 is mounted on the vehicle so that the axial direction of the relief valve 54 is oriented in a direction other than the vertical direction, the valve opening pressure of the relief valve 54 may fluctuate, due to an increase in the frictional resistance of the sliding portion, fluctuations in the biasing forces of both coil springs 154, 161, and the like. In contrast, the frictional resistance of the sliding portion is reduced and fluctuations in the biasing force of both coil springs 154, 161 can be suppressed by mounting the relief valve 54 on the vehicle so that the axial direction is oriented in the vertical direction. As a result, fluctuations of the valve opening pressure of the relief valve 54 can be suppressed.

The dimension in the direction along the axial direction of the relief valve 54 of the sealing valve 38 is relatively small, that is, the dimension in the vertical direction is relatively small. As a result, for example, a sealing valve 38 can be installed on an underfloor space or the like having a small size in the vertical direction of the vehicle. Therefore, the degree of freedom for installation of the sealing valve 38 to the vehicle can be improved.

In the evaporated fuel processing device 12, the sealing valve 38 provided in the vapor passage 31 between the fuel tank 15 and the canister 34 is miniaturized. Thus, the mountability of the evaporated fuel processing device 12 on the vehicle may be improved.

Although the present disclosure has been described with reference to specific embodiments, the arts of the present disclosure are not limited to the above embodiments, and various modifications are possible.

For example, the fluid control valve of the present disclosure is not limited to an evaporative fuel processing device 12, and may instead be applied to other devices. The electric valve 52 and the relief valve 54 may be arranged so that their axial directions differ from each other, and the exact orientations thereof are not limited.

In the embodiment described above, the relief valve side opening 88 of the communication passage 84 of the bypass passage 90 may open to the relief valve 54. The electric valve side opening 86 of the communication passage 84 of the bypass passage 90 may open to the electric valve 52 via the first side surface 65A of the first valve chamber 65 and the second side surface 67A of the second valve chamber 67. However, only one of them may open to the respective side surface.

In addition, as the electric motor used for the electric valve 52 of the sealing valve 38, a DC motor capable of controlling the rotation direction, rotational speed, and rotation amount may be used. If a DC motor is used, it is preferable to initialize the origin position by using, for instance, a stroke sensor that detects the position of the valve guide 94.

The electric motor of the electric valve 52 may include an output shaft, which may move in the axial direction and that incorporates a feed screw mechanism. In this case, the valve guide 94 may be integrated with the output shaft.

Further, the electric valve 52 may be provided with an electromagnetic solenoid, which may be closed in a non-energized state and opened by energization.

Further, the number of connecting means 120 may be increased or decreased, as appropriate. The engaging projection 122 and the engaging groove 124 of the connecting means 120 may be arranged in the reverse arrangement. That is, they be arranged so that the engaging projection 122 may be provided in the valve guide 94, and the engaging groove 124 may be provided in the valve element 96.

The valve guide 94 and the auxiliary spring 112 may be omitted by connecting the valve element 96 to the output shaft of the stepping motor 92 or the like via the feed screw mechanism 110.

Techniques are disclosed in various aspects in the present disclosure. A first aspect is as follows. A fluid control valve may comprise a valve casing, an electric valve, and a relief valve. The valve casing includes a main passage having a first valve port and includes a bypass passage bypassing the first valve port. The fluid control valve may also have a second valve port, a first valve chamber communicating with the downstream side of the first valve port, and a second valve chamber communicating with the downstream side of the second valve port. The electric valve is provided in the first valve chamber and may open and close the first valve port in response to electric control. The relief valve is provided in the second valve chamber. The relief valve includes a positive pressure relief valve mechanism to be opened when the pressure in the main passage of the upstream side of the first valve port is equal to or higher than a predetermined positive pressure value. The relief valve may also include a negative pressure relief valve mechanism to be opened when the pressure in the main passage on the upstream side of the first valve port is equal to or less than the predetermined negative pressure value. The electric valve and the relief valve are arranged so that their axial directions are different from each other. The bypass passage includes the communication passage that communicates the first valve chamber and the second valve chamber. The communication passage is opened to at least one of the side surfaces of the first valve chamber and one of the side surface of the second valve chamber.

According to the first aspect, the electric valve and the relief valve may be oriented so that their axial directions are different from each other (e.g., not aligned or parallel to each other). Therefore, the dimension in the direction along the axial direction of the relief valve may be shortened. Accordingly, the fluid control valve may be miniaturized.

The communication passage of the bypass passage may open into at least one of the side surface of the first valve chamber and the second valve chamber. Therefore, the size of the electric valve or the relief valve in the radial direction may be reduced, in comparison with the case where the communication passage is opened to the outside in the radial direction of the seat surface of the valve port. Consequently, the fluid control valve may be miniaturized. Thus, the mountability of the evaporated fuel processing device 12 to the vehicle may be improved.

A second aspect is a fluid control valve according to the first embodiment, wherein the minimum cross-sectional area of the communication passage may be formed smaller than the minimum cross-sectional area of the passage part upstream of the second valve port.

According to the second aspect, the minimum cross-sectional area of the communication passage from the relief valve to the electric valve in the bypass passage may be formed smaller than the minimum cross-sectional area of the passage part upstream of the second valve port of the relief valve. As a result, regarding the flow of fluid when the positive pressure relief valve mechanism in the relief valve is opened, excessive pressure fluctuations may be suppressed by the throttling action of the communication passage 84. Accordingly, noise due to the evaporated fuel flow (gas flow) may be suppressed.

A third aspect is a fluid control valve according to the first embodiment or the second embodiment, wherein the second valve port may be positioned on the top side with respect to the main passage, when in a vehicle mounted state.

According to the third aspect, the second valve port, which is formed in the relief valve, may be mounted on the vehicle on the top side with respect to the main passage. Therefore, moisture and oil adhering to the seat surface formed in the second valve port may fall into the main passage under its own weight. Accordingly, freezing and material deterioration of the seat surface may be suppressed.

A fourth aspect is an evaporated fuel processing device comprising the vapor passage for communicating the fuel tank and the canister, and the sealing valve disposed in the vapor passage, wherein the sealing valve is any one of the first to the third embodiments.

According to the fourth aspect, the sealing valve applied to the evaporated fuel processing device may be the fluid control valve described above. Since the sealing valve is small, mountability of the evaporated fuel processing device on the vehicle may be improved.

What is claimed is:

1. A fluid control valve, comprising:
    a valve casing, comprising:
       a main passage including a first valve port;
       a bypass passage bypassing the first valve port, wherein the bypass passage includes a second valve port;
       a first valve chamber in fluid communication with a downstream side of the first valve port; and
       a second valve chamber extending between a valve seat and a cap, wherein the second valve chamber is in fluid communication with a downstream side of the second valve port;
    an electric valve disposed in the first valve chamber, wherein the electric valve is configured to open and close the first valve port; and
    a relief valve disposed in the second valve chamber, the relief valve comprising:
       a positive pressure relief valve configured to open when a pressure in a main passage on an upstream side of the first valve port is equal to or greater than a predetermined positive pressure value; and
       a negative pressure relief valve configured to open when the pressure in the main passage on the upstream side of the first valve port is equal to or less than a predetermined negative pressure value,
    wherein:
       the electric valve and the relief valve are oriented such that a central axis of the electric valve and a central axis of the relief valve are not parallel to each other,
       the bypass passage includes a communication passage in fluid communication with the first valve chamber and the second valve chamber,
       the communication passage comprises:
          a first end portion having a first port that opens into the first valve chamber; and
          a second end portion having a second port that opens into the second valve chamber, wherein the communication passage extends linearly from the first port to the second port in parallel with the central axis of the electric valve,
       the bypass passage is positioned on one side of the valve casing, and
       the communication passage opens into at least one of the side surfaces of the first valve chamber, the second valve chamber, or the first valve chamber and the second valve chamber.

2. The fluid control valve of claim 1, wherein a minimum cross-sectional area of the communication passage is less than a minimum cross-sectional area of a part of the main passage on an upstream side of the second valve port.

3. The fluid control valve of claim 1, wherein the second valve port is positioned on a top side with respect to the main passage in a vehicle mounted state.

4. An evaporated fuel processing device, comprising:
    a vapor passage configured to provide fluid communication between a fuel tank and a canister; and
    a sealing valve disposed in the vapor passage,
    wherein the sealing valve is the fluid control valve of claim 1.

5. A fluid control valve, comprising:
    a valve casing, comprising:
       a main passage including a first valve port;
       a bypass passage bypassing the first valve port, wherein the bypass passage includes a second valve port;
       a first valve chamber in fluid communication with a downstream side of the first valve port; and
       a second valve chamber extending between a valve seat and a cap, wherein the second valve chamber is in fluid communication with a downstream side of the second valve port;
    an electric valve disposed in the first valve chamber, wherein the electric valve is configured to open and close the first valve port; and
    a relief valve disposed in the second valve chamber, the relief valve comprising:
       a positive pressure relief valve configured to open when a pressure in a main passage on an upstream side of the first valve port is equal to or greater than a predetermined positive pressure value; and
       a negative pressure relief valve configured to open when the pressure in the main passage on the upstream side of the first valve port is equal to or less than a predetermined negative pressure value,
    wherein:
       the electric valve and the relief valve are oriented such that a central axis of the electric valve and a central axis of the relief valve are not parallel to each other,
       the bypass passage includes a communication passage in fluid communication with the first valve chamber and the second valve chamber, the communication passage comprises:
- a first end portion that opens into the first valve chamber; and
- a second end portion that opens into the second valve chamber, wherein the communication passage extends linearly from the first end portion to the second end portion in parallel with the central axis of the electric valve, and wherein the second end portion extends into the second valve chamber in a direction that is perpendicular to the central axis of the relief valve, the bypass passage is positioned on one side of the valve casing, and the communication passage opens into at least one of the side surfaces of the first valve chamber, the second valve chamber, or the first valve chamber and the second valve chamber.

6. The fluid control valve of claim 5, wherein a minimum cross-sectional area of the communication passage is less than a minimum cross-sectional area of a part of the main passage on an upstream side of the second valve port.

7. The fluid control valve of claim 5, wherein the second valve port is positioned on a top side with respect to the main passage in a vehicle mounted state.

* * * * *